United States Patent
Raaymakers

(10) Patent No.: US 7,486,602 B2
(45) Date of Patent: Feb. 3, 2009

(54) TILT CONTROL FOR READING INFORMATION

(75) Inventor: Jeroen Arnoldus Leonardus Johannes Raaymakers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 610 days.

(21) Appl. No.: 10/538,098

(22) PCT Filed: Nov. 4, 2003

(86) PCT No.: PCT/IB03/04989

§ 371 (c)(1),
(2), (4) Date: Jun. 8, 2005

(87) PCT Pub. No.: WO2004/053854

PCT Pub. Date: Jun. 24, 2004

(65) Prior Publication Data
US 2006/0072413 A1    Apr. 6, 2006

(30) Foreign Application Priority Data
Dec. 10, 2002    (EP) .................................. 02080218

(51) Int. Cl.
*G11B 7/00*    (2006.01)
(52) U.S. Cl. .............. 369/53.34; 369/44.32; 369/53.19; 369/44.13; 369/47.31
(58) Field of Classification Search .................. None
See application file for complete search history.

(56) References Cited

U.S. PATENT DOCUMENTS

| 5,001,690 A | * | 3/1991 | Kamiya et al. ........... 369/44.32 |
| 5,856,930 A | * | 1/1999 | Hosono ...................... 715/719 |
| 6,339,580 B1 | | 1/2002 | Kawashima et al. |
| 2002/0060964 A1 | * | 5/2002 | Park ........................ 369/53.19 |

FOREIGN PATENT DOCUMENTS

| JP | 03242832 A1 | 10/1991 |
| JP | 03242832 B1 | 10/1999 |
| JP | 2001023213 A | * | 1/2001 |

OTHER PUBLICATIONS

Translation of Sato, JP 03-242832 A, published Oct. 29, 1991.*
ISR for Publication, International Publication No. WO2004/053854.

* cited by examiner

Primary Examiner—Peter Vincent Agustin
(74) Attorney, Agent, or Firm—Michael E. Belk

(57) ABSTRACT

An apparatus for scanning a track on a record carrier has a head for scanning the track and generating a read signal. The tilt between the head and the record carrier (11) is compensated via a tilt servo loop. Thereto the head is provided with tilt compensating actuators (42). A measure of the tilt is jitter in the read signal generated by a front end (43) and filter (44). A wobble generator (40) provides a wobble signal to the actuators and to an input of multiplier (45) for synchronous detection of the jitter. The output of the multiplier (45) is coupled to a low pass filter (46) for generating a tilt error signal coupled to a tilt controller (47) for generating a tilt control signal.

9 Claims, 4 Drawing Sheets

Figure 3:
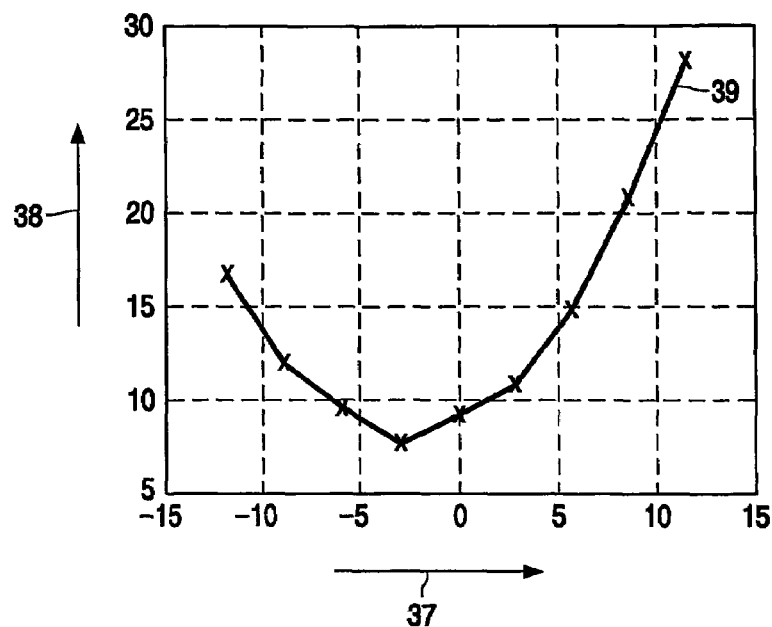

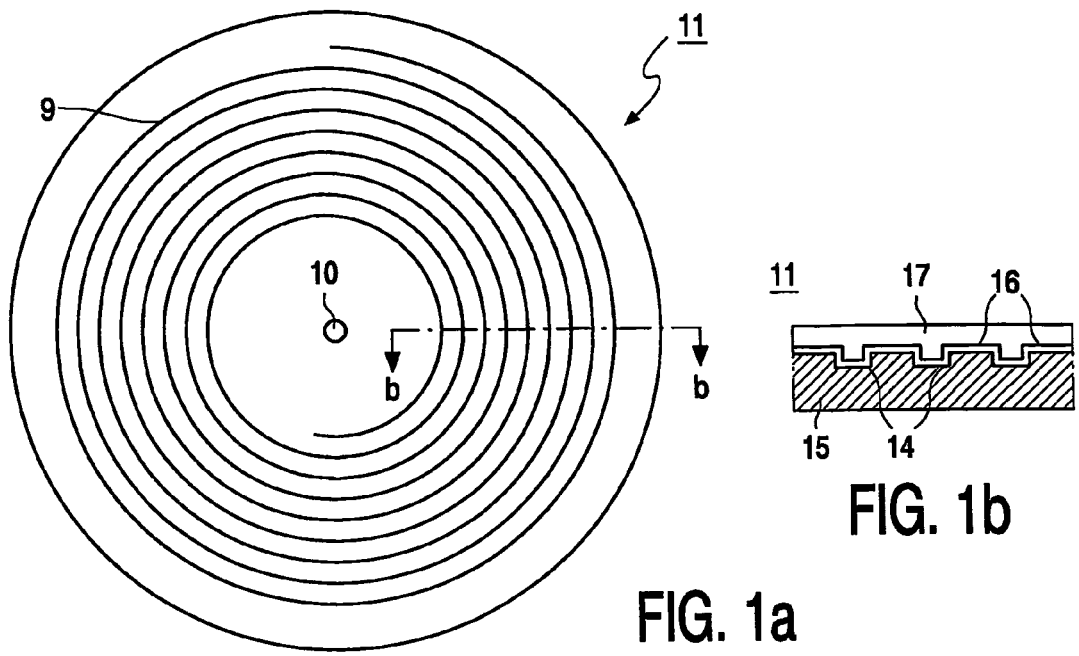
FIG. 1a
FIG. 1b
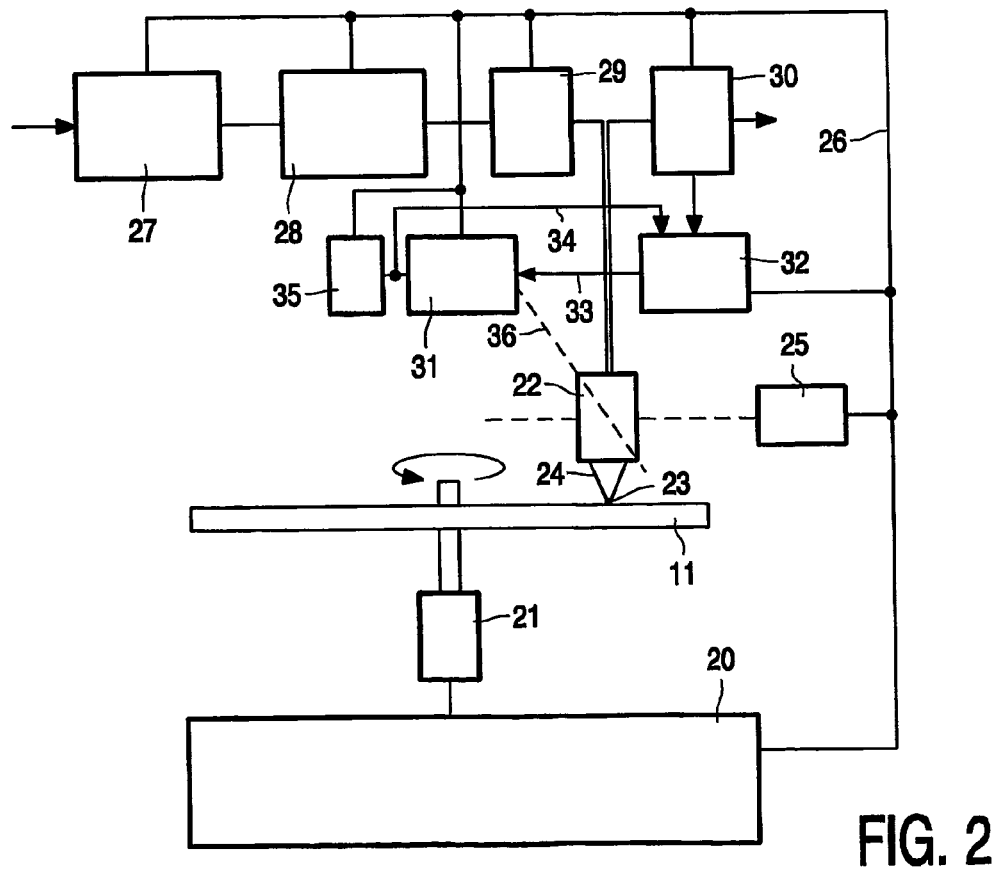
FIG. 2

TILT CONTROL FOR READING INFORMATION

The invention relates to a device for scanning a track on a record carrier, and reading information from the track, the track comprising marks representing the information.

The invention further relates to a method of scanning a track on a record carrier, and reading information from the track, the track comprising marks representing the information.

A device for scanning a track and reading information is known from patent U.S. Pat. No. 6,339,580. The device has a head for generating a read signal for reading information represented by marks in a track on a record carrier like an optical disc. It is discussed that an angle between the record carrier and the reading head, called skew or tilt, causes degradation in the read signal. The degradation can be detected by measuring jitter in the read signal. Marks in the track correspond to signal components, e.g. zero crossings, in the read signal. The jitter is a measure of the deviation of such signal components from their nominal position. The jitter is detected by measuring the difference between a re-generated clock signal and the actual zero crossings of the read signal. The device has actuators for adjusting the tilt between the head and the record carrier. First the tilt is measured in an initial state, e.g. just after loading the disc, by positioning the tilt actuators in a number of positions and detecting the corresponding jitter. The setting providing the minimum jitter is selected for the initial actuator control signal. Further the device is provided with a separate tilt sensor. After the initial state the signal of the tilt sensor is used for forming a skew servo for maintaining a skew state corresponding to the initially selected skew. A problem of the known device is that for determining the tilt setting the reading process has to be delayed or interrupted and a number of tilt actuator settings has to be tested consecutively, including settings that result in a high jitter value. Further a separate sensor is needed for maintaining the selected tilt correction.

Therefore it is an object of the invention to provide a device and method for controlling the tilt without additional sensor.

To this end, according to the invention, the device comprises
a head for scanning the track and generating a read signal,
a read unit for retrieving the information from the read signal,
a jitter detecting unit for detecting an amount of jitter in the read signal due to signal components corresponding to the marks,
tilt control means for compensating a tilt angle between the head and the record carrier, and
wobble means for providing a wobble signal to the tilt control means, the jitter detecting unit being arranged for generating a tilt error signal in dependence on the amount of jitter in the read signal and the wobble signal, and the tilt error signal being coupled to the tilt control means for constituting a tilt control loop. The effect of adding a wobble signal to the tilt control means is that the actuator will slightly vary its tilt compensation around its nominal position. Thereby a varying amount of jitter will be generated in the read signal. The variation in the jitter is analyzed in combination with the known source of disturbance, i.e. the wobble signal, in the jitter detecting unit for generating a jitter error signal. The jitter error signal provides a corrective measure for controlling the tilt control means in a closed servo loop.

The invention is also based on the following recognition. The system as disclosed in said U.S. Pat. No. 6,339,580 provides a solution for detecting an initial tilt error state by a series of jitter measurements and finding the lowest jitter value for selecting the best tilt actuator setting. The inventor has seen that the jitter signal increases similarly on both sides of the optimal tilt setting. Adding a predefined wobble signal results in a deviation from the actual tilt setting in a predefined direction, and then either an increase or decrease can be observed from the jitter signal. Detecting the increase for a predefined wobble signal indicates that the tilt correction must be opposite to the direction of the predefined wobble signal. Hence from analyzing the detected increase or decrease in combination with the known wobble signal an error signal that has the right polarity for correcting a tilt deviation is generated.

In an embodiment of the device the wobble means is arranged for providing the wobble signal in the form of a periodical wobble signal, in particular a sinusoidal wobble signal. This has the advantage that the jitter variations due to the wobble can be effectively detected and separated from other disturbances, e.g. by frequency filtering.

An embodiment of the device comprises drive means for rotating the record carrier at a rotation frequency and in the device the wobble means is arranged for adjusting the periodical wobble signal in dependence of the rotation frequency. This has the advantage that disturbances due to the rotation frequency can be easily filtered from the jitter signal. Further the wobble frequency can be lower for certain rotation frequencies, which limits dissipation and wear in the tilt compensating actuators.

An embodiment of the device comprises drive means for rotating the record carrier at a rotation frequency and in the device the wobble means is arranged for establishing a predefined ratio between the rotation frequency and frequency of the periodical wobble signal, the ratio being predefined for separating tilt frequency components that are indicative of the tilt angle from difference frequency components between the rotation frequency and frequency of the periodical wobble signal. Variations in the jitter result from modulation by the wobble signal. Hence the actual tilt generates tilt frequency components to be detected. The inventor has seen that further frequency components will be generated in the jitter signal at difference frequencies between the rotation frequency and the wobble frequency. Using a relatively low wobble frequency causes these difference frequency components to be positioned in the resulting spectrum in the same area as the tilt frequency components indicative of the tilt angle. By carefully predefining the ratio the inventor has succeeded in separating said difference frequency components from the tilt angle components. Further the difference frequency components are independent of the rotation frequency, because the wobble frequency is locked to the rotation frequency by said ratio. Hence, even in systems having a varying rotation speed, such frequency components can easily be filtered out by a filter having a zero transfer at fixed frequencies.

In an embodiment of the device the predefined ratio between the rotation frequency and the periodical wobble signal is substantially equal to $(0.5*n+0.25)$, n being an integer $\geq 0$, in particular the ratio being substantially equal to 0.75 or 1.25. This has the effect that during demodulation a DC component can be generated substantially corresponding to the DC tilt deviation, while disturbing frequency components due to difference frequencies will have a maximal distance to the DC component. This has the advantage that the disturbances due to the rotation of the record carrier can effectively be filtered from the tilt servo loop.

In an embodiment of the device the wobble means is arranged for detecting one of a multitude of ranges of rotation frequency and for adjusting the frequency of the periodical wobble signal to the detected range, in particular for detecting a low speed mode or a high speed mode and correspondingly setting a ratio of substantially 1.25 or 0.75 between the rotation frequency and the frequency of the periodical wobble signal. This has the advantage that for the higher rotation speeds the wobble frequency is lower, which prevents interactions with mechanical oscillations due to resonance frequencies of the tilt actuator system and torsion suspension elements and limits dissipation.

Further preferred embodiments of the device according to the invention are given in the further claims.

Figure 4:
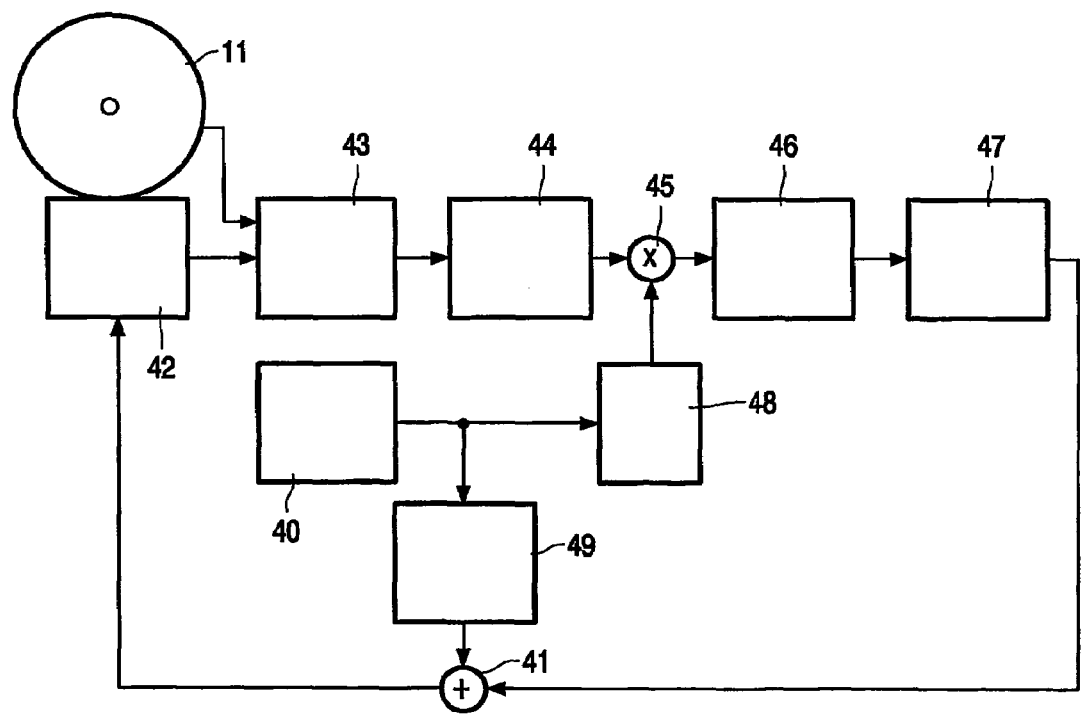
Figure 5:
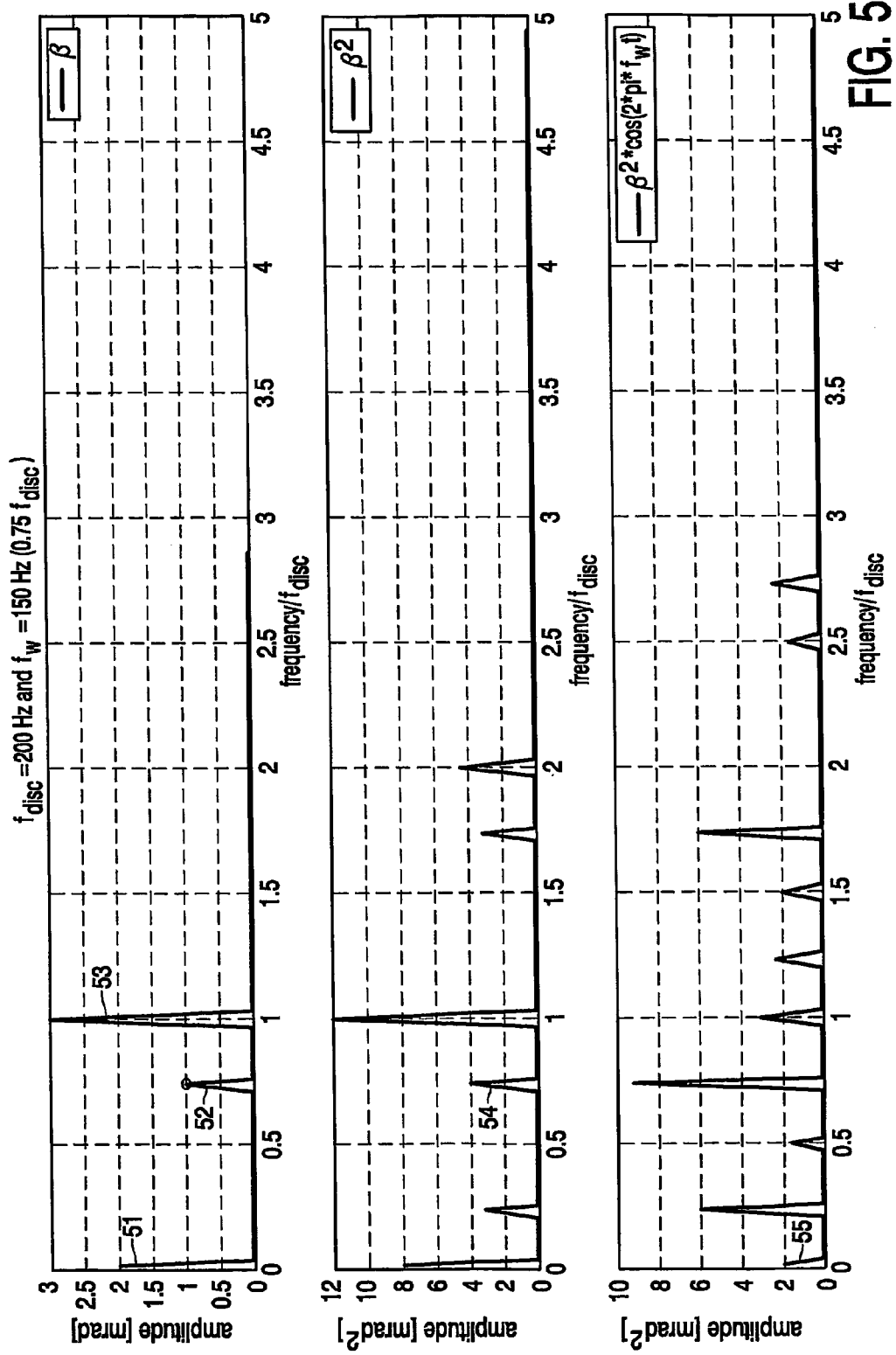
Figure 6:
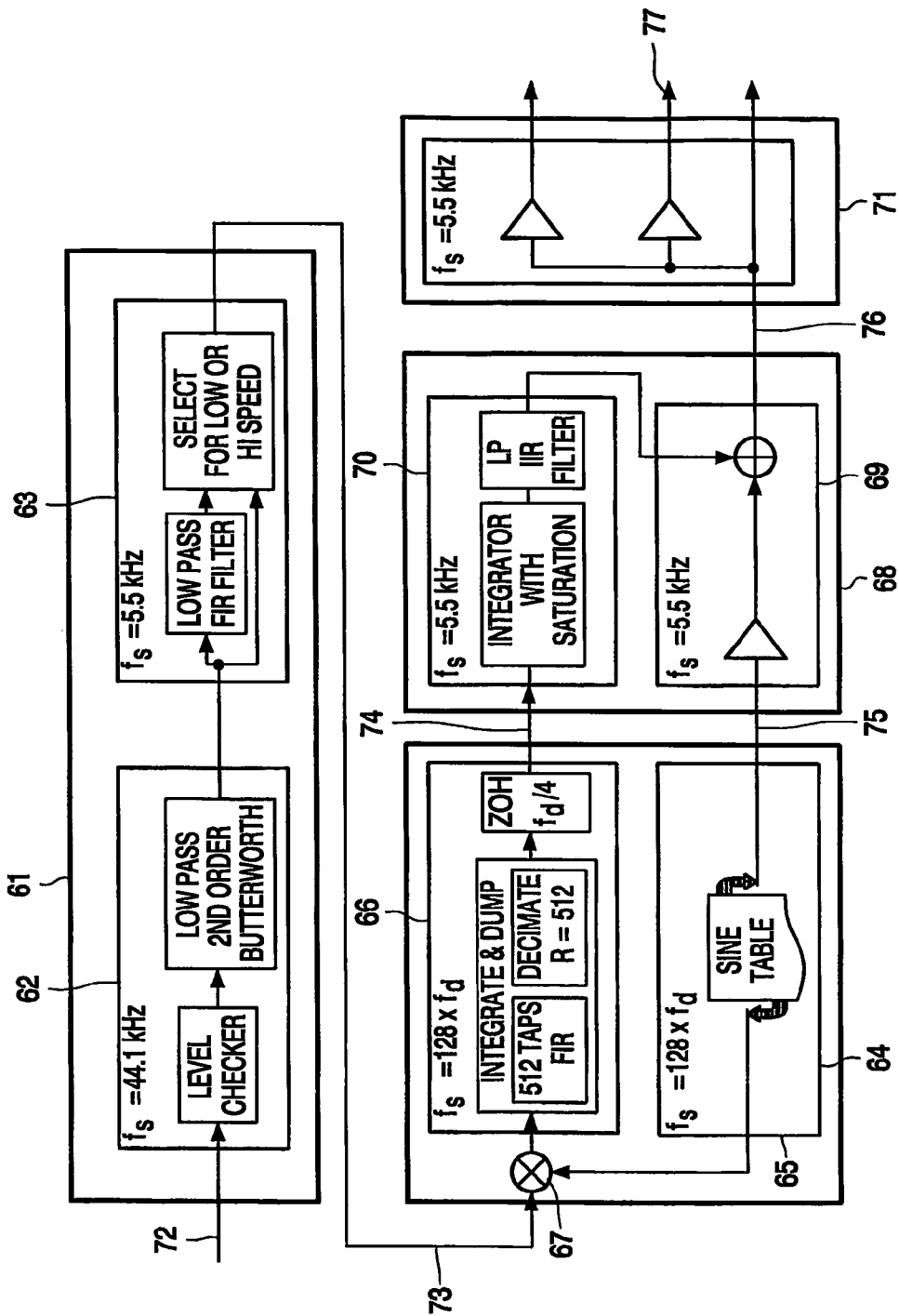

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a scanning device, FIG. 3 shows the relation of disc tilt and jitter, FIG. 4 shows a servo loop for tilt, FIG. 5 shows a frequency spectrum of jitter signals, and FIG. 6 shows a tilt control unit.

In the Figures, elements which correspond to elements already described have the same reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blue-ray Disc (BD). Further details about the DVD disc can be found in reference: ECMA-267: 120 mm DVD—Read-Only Disc—(1997). The information is represented on the information layer by providing optically detectable marks along the track, e.g. pits or crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

In an embodiment the record carrier 11 is carrying information representing digitally encoded video according to a standardized format like MPEG2.

FIG. 2 shows a scanning device for scanning information on a record carrier 11. The device is provided with means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30.

The control unit 20 controls the scanning and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits.

The device has a tilt control unit 31 coupled to the control unit 20 via the system bus 26. The tilt control unit 31 controls or compensates the tilt between the head 22 and the record carrier 11 for achieving a high quality read signal as further explained below. The tilt control unit 31 receives a tilt error signal 33 and provides control signals to tilt actuators as indicated by dashed line 36. It is noted that tilt between disc and head adds unwanted coma to a read spot, and a 'coma' corrector is needed. It is possible to correct tilt coma with an actuator capable of adding comatic aberration, but is controlled to do this with opposite sign. An option is a Liquid Crystal correcting actuator which adds coma without physically tilting. In an embodiment the head 22 is provided with tilt actuators for tilting the head. Further a tilting frame which will move the entire optical system (usually called OPU) is an option which truly removes disc tilt and therefore coma. In a further embodiment the tilt actuators are for tilting only one optical element or a small subset of optical elements in the read head for controlling the tilt angle. In an embodiment the actuators are for rotating the objective lens by controlling torsion suspension hinges.

The device has a jitter detecting unit 32 coupled to the read processing unit 30 for detecting an amount of jitter in the read signal due to signal components corresponding to the marks. The read signal is analyzed to detect a deviation of the nominal signal of a mark.

In an embodiment of the device the jitter is detected by detecting the actual position of zero crossings with respect to a regenerated clock signal. The relevant parts of the spectrum of the jitter signal can be filtered by a suitable band pass filter. In an embodiment the jitter detecting unit 32 is arranged for generating the tilt error signal by detecting the amount of jitter in the read signal synchronously with the wobble signal, e.g. synchronous detection by multiplying the jitter signal with the wobble signal, if necessary taking into account phase shifts due to inherent delays in the loop.

In an embodiment the jitter detecting unit 32 comprises a filter unit for low pass filtering the tilt error signal. The low pass filter has a substantially zero transfer function at difference frequency components between the rotation frequency and frequency of the periodical wobble signal.

In an embodiment the device is provided with means for recording information on a record carrier of a type which is writable or re-writable, for example CD-R or CD-RW, or DVD+RW or BD. The device comprises write processing means for processing the input information to generate a write signal to drive the head 22, which means comprise an input unit 27, and modulator means comprising a formatter 28 and a modulator 29. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

In an embodiment the device comprises a the tilt control unit 31 is arranged for reading a part of the track in or near the track to be recorded for determining a local tilt error signal. It is noted that for writable discs the track may not yet contain marks. Hence the tilt control unit first reads a part of the track that has marks in the vicinity of the track to be recorded, e.g. a previous track just written. The writing process is interrupted for performing such a tilt measurement. After the measurement the local tilt error signal is used for controlling the tilt actuators during subsequent recording.

FIG. 3 shows the relation of disc tilt and jitter. In a horizontal direction 37 the tilt in mrad is given. In a vertical direction 38 the jitter in % is given. A curve 39 indicates the jitter values. The detection of bits in a binary signal involves the determination of the moments where a transition occurs. The time error between a detected transition and the data clock, which is also extracted from the HF signal, is called jitter. Jitter is often expressed in a percentage of the bit clock. Jitter is a measure of the quality of the readout channel and it is used as a function of another drive parameter to express the sensitivity of the readout channel to this parameter. For example: the channel bit rate for DVD is 26.16 MHz, the channel period is 38.2 ns. A RMS timing error of 3.0 ns corresponds to a jitter of 8%. A so called jitter-disc tilt bathtub gives the relation between disc tilt and readout jitter. An example is shown in FIG. 3. In general jitter values higher then 15% are considered unacceptable. A typical range of disc tilt to keep the jitter below 15% in a system with numerical aperture NA=0.65 is +−8 mrad. The most dominant contributors to radial tilt are discs that are roughly umbrella shaped. The average radial tilt over one revolution, the so called 'static' or 'DC' part, is dominant over the part which varies over one revolution, the so called 'AC' part. In an embodiment of the device for practical disc tilt compensation only the DC part is compensated, because compensating the AC part would require a high speed tilt actuator.

FIG. 4 shows a servo loop for tilt. An optical unit and front end 43 generates a read signal from the record carrier 11, which read signal is analyzed to derive the jitter signal which is affected by the tilt actuator 42. The jitter signal is coupled to a filter 44 to remove high frequency components and coupled to a multiplier 45. A wobble generator 40 provides a wobble signal via a phase delay 48 to the other input of multiplier 45 for synchronous detection. The phase delay 48 compensates for fixed delays in the loop. The output of the multiplier 45 is coupled to a low pass filter 46, e.g. a digital filter operating at a lower sample frequency than the first filter 44. The output of the low pass filter 46 is coupled to a tilt controller 47 for generating a tilt control signal, e.g. a common PID type controller. In practice the integrator (I) is sufficient, and a differentiator (D) is not required. The output of the controller 47 is coupled to an adder 41, while the wobble signal is coupled to the other input of adder 41 via a gain unit 49, for generating an actuator drive signal for the actuator 42.

The function of the tilt servo control loop is based on continuously 'wobbling' the actuator and monitoring the response in the jitter signal. From the response of the jitter signal the tilt error signal is extracted by means of synchronous detection. This error signal is fed to a simple integrator serving as a controller. The output of the controller is added to the wobble and fed to the actuator tilt output. To explain the principle we use the following simplified linear relationship between comatic aberration c and actuator tilt $\beta_a$ respectively disc tilt $\beta_b$:

$$c_a = \lambda_a \beta_a$$

$$c_d = \lambda_d \beta_d$$

The parameters are constants and depend heavily on the NA of the system, the functions and are both function of time and contain only harmonics at multiples of the disc rotational speed. Now the readout jitter $\sigma$ can be approximated as $$\sigma = C \cdot (c_d - c_a)^2 + \sigma_0 + n(t) + \sum_i^N A_i \sin(i\Omega_0 t + \varphi_u)$$

where C is a constant relating the total comatic aberration to jitter, $\sigma_0$ is a constant 'bottom jitter', n(t) is noise and the last term contains disc harmonics. Contributors to disc harmonic jitter are for example beam landing and focus offsets. Combining the latter equations leads to $$\sigma = C(\lambda_d^2 \beta_d^2 + \lambda_a^2 \beta_a^2 - 2\lambda_d \lambda_a \beta_d \beta_a) + \sigma_0 + \sigma_r \text{ with}$$

$$\sigma_r = n(t) + \sum_i^N A_i \sin(i\Omega_0 t + \varphi_u).$$

All components in this equation have only frequency content at frequencies equal to integer multiples of the disc rotational speed $\Omega = i\Omega_0$. Now we can split up the actuator tilt in a wobble part and an effective part $$\beta_a = \beta_e + \beta_w \text{ and define } \beta_w = A_w \sin(\Omega_w t).$$

Now we can write $\sigma = \sigma_I + \sigma_{II} + \sigma_{III}$ with $$\sigma_I = 2C\lambda_a(\lambda_a \beta_e - \lambda_d \beta_d)\beta_w$$

$$\sigma_{II} = C\lambda_a^2 \beta_w^2$$

$$\sigma_{III} = C(\lambda_d^2 \beta_d^2 + \lambda_a^2 \beta_e^2 - 2\lambda_d \lambda_a \beta_d \beta_e) + \sigma_0 + \sigma_r$$

the first part contains only frequency components at $\Omega=i\Omega_0$, the spectrum of $\epsilon=2C\lambda_a(\lambda_a\beta_e-\lambda_d\beta_d)$ is copied around carrier $\beta_w$. The signal $\epsilon$ is an excellent error signal because it directly relates to the total coma.

If the sensitivity of the disc and the objective lens to coma is equal then $\epsilon=2C\lambda^2(\beta_e-\beta_d)$, which relates directly to the difference between objective lens and disc tilt. To shift the spectrum of back to zero we multiply it with a harmonic of amplitude $\beta_w/A_w=\sin(\Omega_w t)$. Now the spectrum of $\epsilon$ is concentrated around DC with harmonics at $\Omega=i\Omega_0$ the components $\sigma_1+\sigma_2$ give rise to disturbances at frequencies of $\Omega=i\Omega_0\pm\Omega_c$, $\Omega=\Omega_w$ and $\Omega=3\Omega_w$. Set $\Omega_w=0.25\Omega_0$ and use an integrate and dump filter to filter of harmonics at multiples of $\Omega_w=0.25\Omega_0$. By this filter the DC component is isolated and available as tilt error signal.

FIG. 5 shows a frequency spectrum of jitter signals. Vertically the amplitude is given, while horizontally the frequency relative to the rotational frequency. The wobble frequency $f_w$ is set at $0.75*f_{disc}$, in the example $f_{disc}=200$ Hz and $f_w=150$ Hz. The upper trace shows the spectrum of tilt $\beta$. A first component 51 represents the static tilt caused by an umbrella shaped disc. A second component 52 is the wobble component at $0.75*f_{disc}$. A third component 53 is caused by other tilt variations at the rotational frequency $f_{disc}$. The second trace shows the jitter $\beta^2$, which results from the quadratic nature of the jitter signal due to tilt. In particular the component 54 at f=0.75 results from the static tilt modulated by the wobble frequency. The third trace shows the tilt error signal $\beta^2*\cos(2*pi*f_w t)$ after synchronous demodulation of the jitter signal with the wobble frequency. From the spectrum it is observed that by low pass filtering the static tilt component 55 is now a DC component at f=0 and can be easily detected from the tilt error signal. It is to be noted that using such a low wobble frequency results in mixing the spectral components. However, because the jitter signal only has a few significant components at frequencies related to the rotation frequency and the wobble frequency, a clear separation is achieved by selecting a suitable ratio. It is to be noted that a ratio of $f_w=0.5*f_{disc}$ would result (after synchronous detection) in mixing the component 53 also on the DC, and therefore a separation would be impossible. The selection of $f_w=(0.25+n*0.5)*f_{disc}$ results in a maximal separation of the frequency components at DC and at $0.25*f_{disc}$. Other wobble frequencies between $(0.1+n*0.5)*f_{disc}$ and $(0.4+n*0.5)*f_{disc}$ may be applied for shifting other components while still maintaining a sufficient separation between the components generated by $f_{disc}$.

FIG. 6 shows a tilt control unit. In a jitter front end 61 the jitter input signal 72 is filtered by a first low pass filter 62 and a further low pass filter 63 to remove any high frequency noise and disturbances which are not relevant to the tilt error. The filtered jitter signal 73 coupled to a wobble generator and synchronous detector 64. The signal 73 is multiplied with the wobble signal generated by a wobble generator 65 in a multiplier 67 and filtered by a low pass filter 66 of an 'integrate and dump' type to produce the tilt error signal 74. The wobble frequency is generated based on a sine table and speed information about the rotation frequency $f_d$, e.g. based on tacho pulses obtained from the turntable motor driver (not shown). The operating sample frequency $f_s$ of the wobble generator block and synchronous detector 64 is indicated as $128\times f_d$ and is thereby coupled to the rotation speed. It is to be noted that the coupling to the rotation speed is in particular useful storage systems having a varying rotational rate, e.g. for constant linear velocity (CLV) systems in which the rotational speed varies in inverse proportion with the radial position of the head.

The tilt error signal 74 is coupled to a controller 68, which includes a integrating controller 70 and an adder unit 69 for adding the wobble signal 75 for producing the tilt control signal 76. The tilt control signal 76 is amplified in driver unit 71 for generating drive signals 77 for driving tilt actuators. The function of the circuit is as follows. Readout jitter is calculated in a decoder circuit (not shown) and samples are provided of the jitter signal at $f_s=44$ kHz. Filtering of the jitter signal is performed in three steps at different sample frequencies. The first FIR filter 62 runs at 44 kHz. The output of the first filter is filtered by a second FIR filter 63 running at $f_s=5.5$ kHz. After the second filter 63 the multiplication is performed in multiplier 67. Finally the signal is filtered by an 'integrate and dump' filter 66 locked to the disc rotational speed (running at $S_{ample}$ $128*\Omega_0$). Basically the filter 66 is a 512 taps FIR filter with coefficients equal to one followed by a decimator (R=512). Alternatively the filter 66 is implemented by an integrator that adds all samples of a predefined number of revolutions, e.g. 4 revolutions (and therefore 512 samples) for obtaining a zero transfer function for frequency components at $0.25*i*\Omega_0$. The output of the filter 66 is the tilt error signal 74.

An embodiment of the tilt control unit is provided with a speed range detection unit. The speed range detection unit is coupled to the wobble generator 65 for setting the ratio between the wobble frequency and the rotation frequency. In general by setting a low ratio a relatively low wobble frequency is selected for high rotational speeds for limiting the power dissipation in the wobble actuators. For low rotation speed ranges a higher ratio is set, because at a higher wobble frequency less noise components are shifted to the DC part of the tilt error signal spectrum. In an embodiment the speed range detection unit is for detecting a low speed mode or a high speed mode and correspondingly setting the ratio to 1.25 or 0.75 between the rotation frequency and the frequency of the periodical wobble signal.

Although the invention has been mainly explained by embodiments using optical discs, the invention is also suitable for other record carriers such as rectangular optical cards, magnetic discs or any other type of information storage system that requires control of a tilt angle of the head and/or medium. It is noted, that the scheme can also be used for servo-controlling other systems that produce an even error signal when the disturbances in the even error signal contain only specific harmonics. An uneven error signal which is required in a control loop can be generated from an even error signal having a parabola characteristic (like jitter versus tilt). A compensator (like the tilt actuator) is wobbled with a frequency in between the disturbances. Due to the harmonic nature of the disturbances it is possible to obtain the even error signal, and for further processing synchronous detection is used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for scanning a track on a record carrier, the track comprising marks representing information, the device comprising drive means for rotating the record carrier at a rotational frequency;

a head for scanning the track and generating a read signal, a read unit for retrieving the information from the read signal, a jitter detecting unit for detecting an amount of jitter in the read signal due to signal components corresponding to the marks, tilt control means for compensating a tilt angle between the head and the record carrier, and wobble means for providing a periodic wobble signal to the tilt control means, said wobble means being arranged for adjusting the periodical wobble signal in dependence of the rotational frequency, the jitter detecting unit being arranged for generating a tilt error signal in dependence on the amount of jitter in the read signal and the wobble signal, and the tilt error signal being coupled to the tilt control means for constituting a tilt control loop.

2. Device as claimed in claim 1, wherein the device comprises drive means for rotating the record carrier at a rotation frequency and wherein the wobble means is arranged for establishing a predefined ratio between the rotation frequency and frequency of the periodical wobble signal, the ratio being predefined for separating tilt frequency components that are indicative of the tilt angle from difference frequency components between the rotation frequency and frequency of the periodical wobble signal.

3. Device as claimed in claim 2, wherein the predefined ratio between the rotation frequency and the periodical wobble signal is substantially equal to (0.5*n+0.25), n being an integer $\geq 0$.

4. Device as claimed in claim 1, wherein the wobble means is arranged for detecting one of a multitude of ranges of rotation frequency and for adjusting the frequency of the periodical wobble signal to the detected range.

5. Device as claimed in claim 1, wherein the jitter detecting unit is arranged for generating the tilt error signal by detecting the amount of jitter in the read signal synchronously with the wobble signal.

6. Device as claimed in claim 1, wherein the jitter detecting unit comprises a filter unit for low pass filtering the tilt error signal.

7. Device as claimed in claim 1, wherein the device comprises a write unit for recording information in the track via the head, and the tilt control means is arranged for reading a part of the track in or near the track to be recorded for determining a local tilt error signal and applying the local tilt error signal during subsequent recording.

8. Device as claimed in claim 1, wherein the device comprises a video encoding unit for receiving video data and providing encoded video as information to be recorded.

9. Method of scanning a track on a record carrier, the track comprising marks representing information, the method comprising rotating the record carrier at a rotational frequency, scanning the track via a head for generating a read signal, detecting an amount of jitter in the read signal due to signal components corresponding to the marks, compensating a tilt angle between the head and the record carrier, providing a periodic wobble signal to wobble the tilt angle, adjusting the periodical wobble signal in dependence of the rotational frequency, generating a tilt error signal in dependence on the amount of jitter in the read signal and the wobble signal, and compensating the tilt angle based on the tilt error signal.

* * * * *